United States Patent [19]

Dutton

[11] Patent Number: 5,244,850
[45] Date of Patent: Sep. 14, 1993

[54] BUILDING PRODUCT COMPRISING SLATE PARTICLES EMBEDDED IN A FUSED GLASS BINDER

[75] Inventor: John S. Dutton, Conway, Wales

[73] Assignee: Digive Limited, Great Britain

[21] Appl. No.: 730,966

[22] PCT Filed: Dec. 17, 1990

[86] PCT No.: PCT/GB90/01966
§ 371 Date: Jul. 29, 1991
§ 102(e) Date: Jul. 29, 1991

[87] PCT Pub. No.: WO91/08989
PCT Pub. Date: Jun. 27, 1991

[30] Foreign Application Priority Data
Dec. 19, 1989 [GB] United Kingdom ............... 8928643
Aug. 8, 1990 [GB] United Kingdom ............... 9017391

[51] Int. Cl.⁵ .............................................. C04B 35/18

[52] U.S. Cl. ................................. 501/128; 501/155; 501/32; 106/631

[58] Field of Search ............... 501/32, 17, 128, 155; 106/631

[56] References Cited

U.S. PATENT DOCUMENTS

4,822,420 4/1989 Burkhardt et al. ............... 106/632
4,992,321 2/1991 Kandachi et al. ............... 501/39 X

FOREIGN PATENT DOCUMENTS

0949401 2/1964 United Kingdom .

*Primary Examiner*—Karl Group
*Attorney, Agent, or Firm*—Marshall, O'Toole, Gerstein, Murray & Borun

[57] ABSTRACT

A building product comprises slate particles e.g. flakes, slivers, chips, fragments, and/or powdered dust particles bonded together by a fused glassy binder.

19 Claims, No Drawings

BUILDING PRODUCT COMPRISING SLATE PARTICLES EMBEDDED IN A FUSED GLASS BINDER

DESCRIPTION OF INVENTION

This invention relates to a building product particularly, but not exclusively, for external use, such as a roofing tile, a flooring slab or a cladding panel.

In previous Patent No. GB 1174304 there is described a product comprising particles of granite embedded in a glassy material provided initially as an alkali metal silicate solution. However, the product requires a coating to make it impervious.

According to one aspect of the invention we provide a building product comprising slate particles (as herein defined) bonded together by a fused glassy binder.

By "particles" we mean, slivers or chips or fragments, (collectively called "fragments" herein) having a maximum dimension in the range 1 mm to 12 mm and/or slate powder having a maximum dimension of less than 1 mm and more than 0.075 mm and/or dust having a maximum dimension of less than 0.075 mm such that virtually all the slate dust passes through a B.S. sieve No. 200.

The building product may be a roofing slate, a floor slab or a cladding panel for examples.

According to a second aspect of the invention we provide a method of making a building product comprising the steps of mixing binder material and slate particles, heating the mixture sufficiently to cause the binder material at least to melt, and permitting the binder material to set to bond the slate particles together. The binder may be an alkali metal silicate binder material which contains between 30% and 40% by weight silicates including incidental solids.

The invention will now be described with reference to the following examples.

In a first example, a building product is made by melting recycled bottle glass which comprises a fused mixture of silica, calcium carbonate and sodium carbonate. The glass is heated to a temperature of at least 730° C. and then particles of slate e.g. slate fragments (as herein defined) and slate powder and slate dust (as herein defined) are stirred into or otherwise mixed with the molten glass.

A blob of the slate/glass mixture is then placed into a mould to which pressure is then applied by means of a hydraulic press, which pressure assists in removing any voids from the mixture, and forces the mixture to fill the mould. The product may be reinforced with strands of or a grid of glass fibre and/or metal which may be placed in the mould during moulding, or may subsequent to moulding, be bonded to the product. The mixture is then permitted to set.

The mould may be for a single roofing slate although alternatively if desired, the mould may be for a sheet or layer of the mixture which after setting, is then cut into tiles of a required shape and size. Thus the mould may be adapted to facilitate providing lines of weakness between the individual tiles of the sheet or layer of mixture.

If desired, instead of using recycled bottle glass, any other desired recycled or other glass can be used such as flint glass or borosilicate glass for examples. In each case, the glass when set, provides a fused glassy binder.

The building product may be coloured by adding suitable colouring agents to the binder material when molten, to modify or change the colour of the product from the natural colour of the slate.

Alternatively, or additionally, instead of providing the binder material in the form of recycled glass, the binder material may comprise silicates which need to be heated sufficiently at least to fuse to form a glassy binder, or the binder may comprise a mixture of recycled glass and silicates such as alkali metal silicates. In either case, again colouring agents may be added.

A similar method to that described may be used to make a flooring slab or a cladding panel or any other building product as desired. The product thus made may require fabrication or finishing work to achieve an end product when removed from the mould.

In another, preferred example, a building product is made by mixing together a solution or suspension of an alkali metal silicate, such as sodium silicate, and slate particles. The alkali metal silicate solution or suspension contains between 30% and 40% by weight silicates, including identical solids. Preferably, the suspension includes at least 25% and preferably about 38% by weight, slate particles in the form of fragments and/or powder and/or dust (as herein defined).

Sodium silicate solution/suspension is readily commercially available and is sold in a variety which includes 38.1% solids (Crystal 79 sold by Crosfield Chemicals of Cheshire, England).

Preferably, in the finished product, the slate particles comprises not less than 50% of the product, by weight, and more preferably between 75% and 90% by weight.

In the present example, a mixture of 75% by weight slate particles (of which 30% by weight comprised powdered slate) and 25% Sodasil 79 is prepared.

The mixture produced is then placed in a moulding box and subjected to pressure to remove voids in the material. Preferably, a pressure in the range $1.544 \times 10^8$ $NM^{-2}$ to $3.86 \times 10^8$ $NM^{-2}$ is exerted although greater pressures can be exerted if required.

The mixture is then dried to remove water, for example by heating at a temperature of less than 100° C. for a sustained period e.g. up to about an hour or at least until dry.

When the mixture is dried, the mixture is then fired. It has been found that in the absence of any colouring agents, by firing the mixture in an inert atmosphere such as nitrogen at a temperature of about 920° C., using slate particles sold under the Trade name "Fullersite" a grey coloured product results, whereas firing the same mixture in an oxygen containing atmosphere at a temperature of about 1050° C., results in a clay brown coloured product.

Thus the colour of the end product can be changed by firing the mixture in different atmospheres. Also, by using slate particles of a different type, different coloured products can be produced.

In each case, the firing temperature is sufficient to fuse the silicates of the mixture so that the slate particles become bonded to rather than just coated with, the glassy binder produced.

The mixture is then permitted to cool.

If required, colouring agents may be added to the mixture prior to placing in the moulding box, in the form of coloured glass, or any metallic oxide colouring.

In each case of the examples described, the resultant building product is suitable for external use i.e. the product is generally impervious to water under natural conditions. It is believed that this imperviousness is achieved by virtue of the shape and nature of the slate particles, to which the binder readily bonds.

The same degree of imperviousness has not been achieved when attempting to make a building product using other types of particles.

Whether or not the binder comprises already fused glass such as bottle glass, which simply requires melting, or silicates in solution/suspension which must be heated sufficiently to promote fusing, or a mixture of these, imperviousness is achieved.

Products having different surface characteristics can be achieved by using different size slate particles and fragments, powder and dust in differences proportions. For example, a very smooth product can be produced using predominently slate powder (as herein defined) above, whereas, a product with a rougher surface finish can be made by using a mixture of slate powder and fragments of slate as herein defined. It is preferred for at least some slate powder to be used, and slate dust is usually present in a small proportion in slate fragments and powder.

Slate particles of a suitable type are readily commercially available. For example, suitable slate particles are sold by Penrhyn Quarries Limited under the names "Slate Granules" and "Fullersite" powder in various particle sizes, and in both blue and green physical forms, currently for use as an extender or filler with bitumen, and in paints and coatings. Under a 670 magnification of "Fullersite" the slate particles are seen as flaky and angular rather than elongated. Other types of slate particles such as sold under the name "Delafila" by Delabale Slate which are of slightly different shapes, are also suitable.

In each example described, if desired further shaping manufacturing steps may be carried out on the product to provide an end product e.g. holes may be provided in the product by inserts in the mould, or in the product subsequent to firing.

It is envisaged that the method of the invention may be used to manufacture a compound building product comprising a backing material of any desired nature e.g. natural or synthetic stone, faced with a facing comprising slate particles bound together in a glassy binder, to make the product impervious.

I claim:

1. A finished building product comprising slate particles bonded together by a fused glass binder, the slate particles, comprising at least 50% by weight of the finished building product, being at least one of:
   slate slivers, slate chips and slate fragments having a maximum dimension of 12 mm;
   slate powder having maximum dimension of less than 1 mm; and
   slate dust having a minimum dimension of less than 0.075 mm such that virtually all the dust passes through a BS sieve No. 200.

2. A product according to claim 1 in which at least 25% by weight of the slate particles are at least one of slate powder and dust.

3. A product according to claim 1 wherein the slate particles are only slate powder and slate dust.

4. A product according to claim 1 wherein the glass binder comprises a mass of a silicate.

5. A product according to claim 1 wherein the glassy binder includes metallic oxide colouring agents.

6. A product according to claim 1 wherein the slate particles comprise between 75% and 90% by weight of the finished building product.

7. A method of making a finished building product comprising slate particles bonded together by a fused glass binder comprising:
   mixing together slate particles selected from at least one of:
      slate slivers, slate chips and slate fragments having a maximum dimension of 12 mm;
      slate powder having a maximum dimension of less than 1 mm; and
      slate dust having a minimum dimension of less than 0.075 mm such that virtually all the dust passes through a BS sieve No. 200
   with a glass binder material;
   the amount of slate particles used being sufficient such that the finished building product comprises at least 50% by weight of the slate particles;
   heating the mixture sufficiently to cause the binder material at least to melt; and
   permitting the binder material to set to bond the slate particles together.

8. A method according to claim 7 wherein the binder material is in the form of a member of the group consisting of an alkali metal silicate solution and an alkali metal silicate suspension.

9. A method according to claim 8 wherein the mixture is heated sufficiently to cause the silicate to fuse.

10. A method according to claim 9 wherein the alkali metal silicate binder material contains between 30% and 40% silicates including incidental solids.

11. A method according to claim 7 wherein the slate particle/binder material mixture is placed in a mould prior to heating and is treated in the mould to remove voids.

12. A method according to claim 11 wherein the mixture is compacted in the mould by exerting a pressure greater than $1.544 \times 10^8$ NM$^{-2}$ on the mixture.

13. A method according to claim 12 wherein the mixture is compacted in the mould by exerting a pressure of greater than $3.86 \times 10^8$ NM$^{-2}$ on the mixture.

14. A method according to claim 7 wherein the mixture is dried prior to melting the binder material.

15. A method according to claim 7 wherein the mixture is heated in an inert atmosphere.

16. A method according to claim 7 wherein the mixture is heated in an oxygen-containing atmosphere.

17. A method according to claim 7 wherein the mixture is heated to a temperature of at least 600° C.

18. A method according to claim 7 wherein the mixture is heated to a temperature of greater than 900° C.

19. A finished building product comprising slate particles bonded together by a fused glass binder comprising an amorphous mass of a fused alkali metal silicate, the slate particles, comprising at least 50% by weight of the finished building product, being at least one of:
   slate slivers, slate chips and slate fragments having a maximum dimension of 12 mm;
   slate powder having a maximum dimension of less than 1 mm; and
   slate dust having a minimum dimension of less than 0.075 mm such that virtually all the dust passes through a BS sieve No. 200.

* * * * *